US009742851B2

(12) United States Patent
Petersson et al.

(10) Patent No.: US 9,742,851 B2
(45) Date of Patent: Aug. 22, 2017

(54) METHOD AND ARRANGEMENT FOR REMOTELY CONTROLLING MULTIMEDIA COMMUNICATION ACROSS LOCAL NETWORKS

(75) Inventors: Justus Petersson, Stockholm (SE); Martin Gerdes, Monschau-rohren (DE); Robert Skog, Hasselby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1266 days.

(21) Appl. No.: 12/529,676

(22) PCT Filed: Oct. 25, 2007

(86) PCT No.: PCT/SE2007/050780
§ 371 (c)(1),
(2), (4) Date: Jan. 18, 2010

(87) PCT Pub. No.: WO2008/108699
PCT Pub. Date: Sep. 12, 2008

(65) Prior Publication Data
US 2010/0135279 A1  Jun. 3, 2010

Related U.S. Application Data

(60) Provisional application No. 60/905,001, filed on Mar. 5, 2007.

(51) Int. Cl.
*H04L 12/66* (2006.01)
*H04L 29/08* (2006.01)
*H04L 29/06* (2006.01)

(52) U.S. Cl.
CPC .......... *H04L 67/16* (2013.01); *H04L 65/1026* (2013.01); *H04L 65/1036* (2013.01);
(Continued)

(58) Field of Classification Search
CPC .... H04L 67/16; H04L 65/026; H04L 65/1036
See application file for complete search history.

(56) References Cited

U.S. PATENT DOCUMENTS 7,778,193 B2 * 8/2010 Mizuno et al. ............... 370/252
2002/0141352 A1 * 10/2002 Fangman .......... H04L 29/06027
370/254
(Continued)

FOREIGN PATENT DOCUMENTS

JP  2006295728 A  10/2006
WO  02093848 A1  11/2002
(Continued)

OTHER PUBLICATIONS

Office Action issued on Apr. 11, 2011 in Japanese Patent Application No. 2009-552625, 2 pages.
(Continued)

*Primary Examiner* — Gregory Sefcheck
*Assistant Examiner* — Jael Ulysse
(74) *Attorney, Agent, or Firm* — Rothwell, Figg, Ernst & Manbeck, P.C.

(57) ABSTRACT

A method and arrangement for remotely controlling the communication of media between devices in different local networks (200, 202) using a remote control device (200b). The remote control device obtains discovery information on a first device (200c) and sends a remote access request over a multimedia service network to a home multimedia gateway (202b) in the opposite local network (202) for a connection to a second device (202c) therein. The home multimedia gateway then responds with communication parameters established for the second device in a residential gateway, and the remote control device can then order the first device to execute a multimedia session with the second device by using said communication parameters. This solution enables a remote control device visiting a local network
(Continued)

to order a device in that network to fetch media content from a device in another home network, or vice versa.

23 Claims, 3 Drawing Sheets

(52) U.S. Cl.
CPC ...... *H04L 65/1069* (2013.01); *H04L 65/1006* (2013.01); *H04L 65/1016* (2013.01)

(56) References Cited

U.S. PATENT DOCUMENTS

| | | | |
|---|---|---|---|
| 2002/0152311 A1* | 10/2002 | Veltman | H04L 12/40058 709/227 |
| 2003/0001883 A1* | 1/2003 | Wang | G06F 3/0481 715/736 |
| 2003/0018753 A1* | 1/2003 | Seki | H04L 12/2803 709/219 |
| 2003/0163542 A1* | 8/2003 | Bulthuis | G08C 19/28 709/208 |
| 2003/0229900 A1* | 12/2003 | Reisman | G06F 17/30873 725/87 |
| 2004/0117450 A1* | 6/2004 | Campbell et al. | 709/207 |
| 2004/0117843 A1* | 6/2004 | Karaoguz | H04L 12/2803 725/108 |
| 2004/0213271 A1* | 10/2004 | Lovy | H04L 12/2805 370/401 |
| 2005/0078679 A1* | 4/2005 | Henry et al. | 370/395.2 |
| 2005/0114491 A1* | 5/2005 | Bushmitch | H04L 29/06027 709/223 |
| 2005/0169288 A1* | 8/2005 | Kamiwada et al. | 370/401 |
| 2005/0240665 A1* | 10/2005 | Gu | H04L 12/2805 709/220 |
| 2006/0025132 A1* | 2/2006 | Karaoguz | H04L 12/2803 455/433 |
| 2006/0031459 A1* | 2/2006 | Ahn et al. | 709/224 |
| 2006/0039367 A1* | 2/2006 | Wright | H04L 12/5695 370/382 |
| 2006/0039389 A1* | 2/2006 | Burger | H04L 12/14 370/401 |
| 2006/0041688 A1* | 2/2006 | Wright | H04L 12/5695 709/249 |
| 2006/0114884 A1 | 6/2006 | Remaker | |
| 2006/0120386 A1* | 6/2006 | Rossi et al. | 370/401 |
| 2006/0133392 A1* | 6/2006 | Ajitomi | H04L 12/2803 370/401 |
| 2006/0143295 A1* | 6/2006 | Costa-Requena | H04L 63/0428 709/227 |
| 2006/0168656 A1 | 7/2006 | Stirbu | |
| 2006/0250578 A1* | 11/2006 | Pohl | G06F 3/0238 351/210 |
| 2007/0039055 A1* | 2/2007 | Plastina | G06F 17/30017 726/26 |
| 2007/0211632 A1* | 9/2007 | Song | H04L 12/2803 370/230 |
| 2007/0214241 A1* | 9/2007 | Song et al. | 709/219 |
| 2008/0028088 A1* | 1/2008 | Walter | H04L 61/1582 709/230 |
| 2008/0155607 A1* | 6/2008 | Klappert | H04N 5/44543 725/58 |
| 2009/0037556 A1* | 2/2009 | Kokkinen et al. | 709/217 |
| 2010/0070636 A1* | 3/2010 | Skog et al. | 709/228 |

FOREIGN PATENT DOCUMENTS

| | | |
|---|---|---|
| WO | 2006012610 A2 | 2/2006 |
| WO | 2006039941 A1 | 4/2006 |
| WO | 2006045706 A1 | 5/2006 |
| WO | 2006079891 A1 | 8/2006 |
| WO | 2006115862 A1 | 11/2006 |
| WO | 2008054270 A1 | 5/2008 |

OTHER PUBLICATIONS

R. Sparks, "The Session Initiation Protocol (SIP) Refer Method", RFC 3515, URL, http://www.ietf.org/rfc/rfc3515.txt, Apr. 2003, 20 pages.

Examination Report dated Jan. 25, 2017, issued for Indian patent application No. 4801/DELNP/2009, 8 pages.

Cagenius, T., et al., "An IMS gateway for service convergence in connected homes," Ericsson Research, 2006, XP-002433240, http://www.fitce.org/paper/2006/815.pdf, 6 pages.

Extended European Search Report dated Nov. 22, 2016, issued for European patent application No. 07835364.6, 8 pages.

* cited by examiner

METHOD AND ARRANGEMENT FOR REMOTELY CONTROLLING MULTIMEDIA COMMUNICATION ACROSS LOCAL NETWORKS

CROSS REFERENCE TO RELATED APPLICATION

This application is a 35 U.S.C. §371 National Phase Application from PCT/SE2007/050780, filed Oct. 25, 2007 (published as International Publication No. WO 2008/108699) and designating the United States, which claims the benefit of U.S. Provisional Application No. 60/905,001, filed Mar. 5, 2007. The above identified applications and publication are herein incorporated by reference.

TECHNICAL FIELD

The present invention relates generally to a method and arrangement for remotely controlling media transfer between devices in different local networks.

BACKGROUND

A multitude of different types of communication terminals or devices have been developed for packet-based multimedia communication using IP (Internet Protocol). Multimedia services typically involve transmission of media in different formats and combinations over IP networks. For example, an IP-enabled mobile terminal may exchange media such as visual and/or audio information with another IP-enabled terminal, or may download media from a content server over the Internet.

A network architecture called IMS (IP Multimedia Subsystem) has been developed by the $3^{rd}$ Generation Partnership Project (3GPP) as a platform for handling and controlling multimedia services and sessions, commonly referred to as the IMS network. Thus, an IMS network can be deployed to initiate and control multimedia sessions for IMS-enabled terminals connected to various access networks, regardless of the access technology used. Although conceived primarily to enable multimedia services for mobile IP terminals, the IMS concept can also be used for fixed IP terminals.

Multimedia sessions are handled by specific session control nodes in the IMS network, e.g. the nodes P-CSCF (Proxy Call Session Control Function), S-CSCF (Serving Call Session Control Function), and I-CSCF (Interrogating Call Session Control Function). Further, a database node HSS (Home Subscriber Server) is used in the IMS network for storing subscriber and authentication data. The IMS network may also include various application servers for providing different multimedia services.

According to the IMS platform, the protocol for controlling sessions called SIP (Session Initiation Protocol) is utilised to initiate, operate and terminate multimedia sessions. Standard SIP messages can thus be used by IP terminals or devices for establishing multimedia sessions, such as the session initiating message "SIP invite" and the common response message "SIP 200 OK".

In SIP, an SDP (Session Description Protocol) can also be used, embedded as a self-contained body within SIP messages, to specify different communication parameters needed for a forthcoming multimedia session. This protocol is generally used to provide necessary information in session setup procedures, e.g. device capabilities, media properties, currently used IP addresses, etc., as is well-known in the art.

It is desirable to generally provide IMS-based services also for devices in a limited local or private network such as a residential or office network, also referred to as a LAN (Local Area Network) or PAN (Personal Area Network). In this description, the generic term "local network" is used to represent any such networks, and the term "device" is used to represent any terminal capable of IP communication within a local network. In such local networks, a local IP address is allocated to each device for communication within the network which, however, cannot be used for routing messages and data outside that network.

The devices in a local network may include fixed and wireless telephones, computers, media players, servers and television boxes, the latter often referred to as STB (Set Top Box). In order to provide IMS services for devices in the local network, a multimedia gateway called HIGA (Home IMS Gateway), has been defined that can emulate an IMS terminal from the local network towards the IMS network, to access IMS services on behalf of any device in the local network. The HIGA has valid IMS identities known to the IMS network, such as an IMPI (IMS Private Identity) used for authentication and at least one IMPU (IMS Public Identity) associated with an IMS service profile. In WO 2006/045706 A1 (Ericsson) it is described how devices in a local network can obtain IMS services by means of a HIGA using different IMS identities IMPU.

UPnP (Universal Plug-and-Play) is an architecture, developed in a multi-vendor collaboration called the UPnP Forum, for establishing standardised device protocols for the communication between different IP devices in a local network using different access technologies, operating systems, programming languages, format standards and communication protocols. UPnP further provides standardised methods to describe and exchange device profiles that may include capabilities, requirements and available services in the devices.

UPnP and other protocols also supports a process called "discovery" (or "pairing") in which a device can join a local network, obtain a local IP address, announce its name and IP address, and exchange capabilities and services with other devices within the network. In the following description, the term "discovery information" generally represents any such information such as name, identity, local IP address, URI (Universal Resource Identifier) for stored media content, device capabilities and available services, communicated between the devices during the discovery process. The discovery process can also be conducted within a temporarily formed ad-hoc network, e.g. using Bluetooth communication. Specific service discovery protocols have been standardised for finding devices and their services in the discovery process.

DLNA (Digital Living Network Alliance) is a recently developed technology for acquiring, storing and accessing digital media content from devices in a local network. The UPnP protocol is utilised by DLNA as an underlying protocol for communication between devices within local networks.

An architecture for enabling remote access will also be defined, where remote "UPnP devices" located outside the local network can communicate media with devices within the network. In WO 2006/079891 A1, a solution is described for setting up a VPN (Virtual Private Network) tunnel as a data/media transport channel for such remote UPnP access, e.g. using IPSec (IP Security). However, this solution requires the use of IP address resolution and DNS (Domain Name server) technology, as well as access to a dynamic DNS client in the private network.

There are also some so-called "vertical" solutions available for remote access to home appliances, services and media in a local home network, such as Slingbox, Location-Free, Orb and Soonr. However, it is a problem that these vertical solutions are not standardised and therefore not desirable to use for service providers and network operators, e.g. due to added complexity and limited control. For example, a network operator would then merely act as a "bit-pipe" with no ability to control issues like security, routing, charging and quality-of-service QoS. A standardised "global" solution for remote access would thus enable a more extensive market for this type of services and generally improved services as perceived by end users.

In FIG. 1, a local network 100 is shown with different devices in a family residence or an office. In this example, these devices include a wireless telephone, a fixed telephone, a TV apparatus, a laptop computer, and a media server. The network 100 also includes a conventional gateway 102 connected to an external access network 104 to provide a communication link outside network 100 for the devices, referred to as RGW (Residential Gateway). Although not shown in this figure, the RGW 104 typically includes an NAT (Network Address Translation) function for the mapping of port numbers and IP addresses, and a local DHCP (Dynamic Host Configuration Protocol) server allocating local IP addresses to the devices, as is well-known in the art.

The local network 100 further includes a HIGA 106 providing a connection to an IMS network 108 in which an HSS 110 is shown. The HIGA 106 has different suitable interfaces towards the different devices in network 100, using device-specific protocols. The HIGA 106 may be integrated in the RGW 102, but logically it will be considered as an individual functional unit in this description.

The HIGA 106 holds IMS identity information 112 associated with IMS subscriptions and user/service profiles, such as the above-mentioned IMPI and IMPU, which can be used for accessing the IMS network 108 where corresponding subscriber information 114 is stored in the HSS node 110. Accordingly, a user can log on to the IMS network from a specific used device in the local network 100 by means of HIGA 106, and the local IP address of that used device will then be associated with the user profile.

When HIGA 106 receives a request for a multimedia service from a device in network 100 using a device-specific interface/protocol, HIGA 106 translates the service request into a valid IMS request (typically a SIP invite message) to set up an IMS session on behalf of the device, involving the communication of suitable SIP messages with the IMS network 108. In a similar manner, HIGA 106 can set up an IMS session when receiving an incoming request for a session with a device in the local network 100, by using an IMS identity 112 associated with the device. In either case, communicated media is routed during the session from or to the device over the RGW 102 and the access network 104, as indicated by two-way arrows.

FIG. 1 further illustrates that a local device 100a moves outside the local network 100 thereby becoming a remote device 100a'. The remote device 100a' can then send a SIP invite message to the HIGA 106 over the IMS network 108, to initiate media communication with one of the remaining devices in network 100. In order to do that, the remote device must be an IMS client and use a valid IMS identity for accessing the IMS network.

The above-mentioned DLNA technology also provides for the so-called "3-box model", where a first device can be used for controlling the transfer of media from a second device to a third device within a local network. For example, a small handheld wireless phone may be used as a control unit to direct a laptop computer to stream visual media content to a TV set, in order to view the content on a larger screen and with greater quality as compared to the laptop computer. The TV set is then used as a "media renderer".

However, it is a further problem that no solution is available for applying the 3-box model when the terminals are located in different local networks. It is thus not possible today to remotely control a media transfer across different local networks, for example to direct a device in one local network to communicate media content with a device in another local network.

SUMMARY

It is an object of the present invention to address the problems outlined above. Further, it is an object to provide a solution that enables remote control of media communication between devices in different local networks. These objects and others may be obtained by providing a method and arrangement according to the independent claims attached below.

According to one aspect, a method is provided for remotely controlling the communication of media between a first device in a first local network and a second device in a second local network by means of a remote control device present in the first local network. The first and second local networks each comprises a residential gateway for external connections. In this method, the remote control device obtains discovery information on the first device by conducting a discovery process in the first local network, and sends a remote access request over a multimedia service network to a home multimedia gateway in the second local network, for a connection to the second device. The remote control device then receives communication parameters established for the second device in the residential gateway of the second local network, from the home multimedia gateway over the multimedia service network in response to the remote access request. The remote control device can then order the first device to execute a multimedia session with the second device by using the received communication parameters for the second device in the residential gateway of the second local network. Thereby, the 3-box model can be implemented across different local networks.

According to another aspect, an arrangement in a remote control device is provided for remotely controlling the communication of media between a first device in a first local network and a second device in a second local network when the remote control device is present in the first local network. The first and second local networks each comprises a residential gateway for external connections. The remote control device comprises a discovery unit adapted to obtain discovery information on the first device by conducting a discovery process in the first local network, and a sending unit adapted to send a remote access request over a multimedia service network directed to a home multimedia gateway in the second local network, for a connection to the second device. The remote control device also comprises a receiving unit adapted to receive communication parameters established for the second device in the residential gateway of the second local network, from the home multimedia gateway over the multimedia service network in response to the remote access request. The remote control device further comprises an ordering unit adapted to order the first device to execute a multimedia session with the second device by using the received communication parameters for the second device in the residential gateway of the second local network.

Different embodiments are possible in the method and arrangement in the remote control device above. For example, a browsing unit in the remote control device may use the received communication parameters for media browsing in the second device. Thereby, media content can be found in the second device for transfer to the first device.

The ordering unit may order the first device to fetch media content from the second device. In that case, the ordering unit may send to the first device the received communication parameters and a URL or URI pointing to the selected media content in the second device. Alternatively, the ordering unit may order the first device to send media content to the second device. According to these alternatives, media content can thus be transferred in either direction, as controlled by the remote control device.

The remote access request may be an IMS session invite message directed to an IMS identity of the multimedia gateway. If SIP is used for communication with the home multimedia gateway over the multimedia service network, the IMS session invite message is a SIP INVITE message.

The sending unit may include an external IP address in the remote access request, used by the residential gateway of the first local network for external communication. This external IP address of the first local network can then be used for the forthcoming media session.

The received communication parameters may include an external IP address and port number of the residential gateway of the second local network according to a NAT binding or port mapping established for the second device in the residential gateway. This NAT binding or port mapping of the second local network can likewise be used for the forthcoming media session. The sending unit may further include a local identity of the second device in the remote access request.

According to yet another aspect, an arrangement in a home multimedia gateway is also provided for enabling remote control of media communication between a first device in a first local network and a second device in a second local network by means of a remote control device present in the first local network. The first and second local network each comprises a residential gateway for external connections, the home multimedia gateway being comprised in the second local network. The home multimedia gateway comprises a receiving unit adapted to receive a remote access request from the remote control device over a multimedia service network, for a connection to the second device, and a port mapping unit adapted to obtain communication parameters for the second device in the residential gateway of the second local network, in response to the received remote access request. The home multimedia gateway further comprises a sending unit adapted to send the communication parameters to the remote control device, thereby enabling the remote control device to order the first device to execute a multimedia session with the second device by using the communication parameters.

The port mapping unit may be further adapted to obtain a NAT binding and port mapping as the communication parameters in the residential gateway of the second local network, mapping the local IP address and port number of the second device with an external public IP address and a port number of the residential gateway of the second local network. This NAT binding or port mapping of the second local network can then be used for a forthcoming media session.

Further possible features and benefits of the present invention will be explained in the detailed description below.

BRIEF DESCRIPTION OF THE DRAWINGS

The invention will now be explained in more detail by means of exemplary embodiments and with reference to the accompanying drawings, in which.

DETAILED DESCRIPTION

Figure 1:
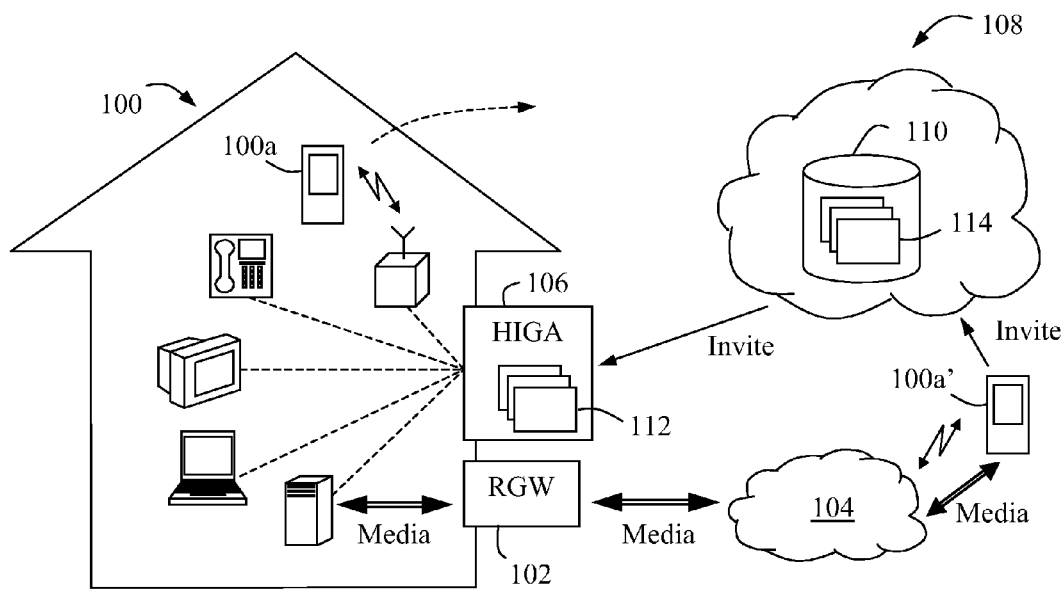
FIG. 1 is a schematic view illustrating a local network when a remote device accesses the network from a location outside the network, according to the prior art.

Briefly described, the present invention can be used for remotely controlling the communication of media between devices in different local networks by means of a remote control device, e.g. according to the above-mentioned 3-box model. In this solution, media can be communicated in a session between a device in a first local network and another device in a second local network by means of residential gateways in each local network, as initiated by means of control messaging over a multimedia service network from a remote control device present in the first local network. In one embodiment, the remote control device communicates IMS messages over an IMS network to set up and control the session.

However, it should be understood that even though the following embodiments are described in terms of IMS and IMS messaging for simplicity, any other equivalent or similar concept and standards for multimedia networks and communication may also be used within the scope of the present invention.

In this description, the term "remote control device" represents any kind of device that is used to initiate the transfer of media between other devices across two local networks. Although the remote control device is present in one of the two local networks, it does not participate in the media communication itself. If an IMS network is used, the remote control device should be an IMS enabled device, i.e. having an IMS client and a valid IMS identity. However, it is also possible to use a separate IMS enabled device to access the IMS network on behalf of another device used for controlling the session remotely, together effectively acting as the remote control device described below.

The remote control device will first conduct a discovery process in the first local network, in order to announce its presence and obtain knowledge of any other devices present in that network. The remote control device will thus obtain an assigned local IP address when registering in the network. In the discovery process, it will announce its name and IP address, and further obtain information on identities, IP addresses, capabilities and services of any other devices in the network. Thereby, the user of the remote control device can select a discovered first device in the first local network for media communication with a known second device in the opposite second local network. For example, a TV set in the first local network may be selected as suitable for receiving and playing out media content from a media server in the second local network, or vice versa.

The remote control device may then obtain parameters used by the residential gateway in the first local network for external communication, including an external public IP address of that residential gateway. The remote control device also sends a remote access request over a multimedia service network (e.g. IMS network) to a home multimedia gateway (e.g. HIGA) in the second local network, for a connection with the second device. The remote access request may be an IMS session invite message directed to an IMS identity (e.g. an IMPU) of the home multimedia gateway specifically allocated for remote access. The IMS session invite message further includes an identity of the second device and the obtained external IP address of the residential gateway in the first local network.

The home multimedia gateway will then respond by sending an acknowledge message over the IMS network to the remote control device, containing communication parameters in the residential gateway of the second local network assigned for external communication with the second device, typically an IP address and port number. The remote control device user may then browse for media content in the second device, e.g. using a VPN tunnel, to select media stored in the selected device for transfer. The session invite message and the acknowledge message above may be communicated as regular SIP messages over a suitable session control node in the IMS network.

The remote control device may then order the selected device in the first local network to set up a media session with the second device in the second local network, e.g. to fetch media from the second device. The selected first device can then finally communicate media with the second device across the first and second local networks in either direction. Alternatively, the remote control device in the first local network may order a selected device in that network to send media to the second device in the second local network.

Figure 2:
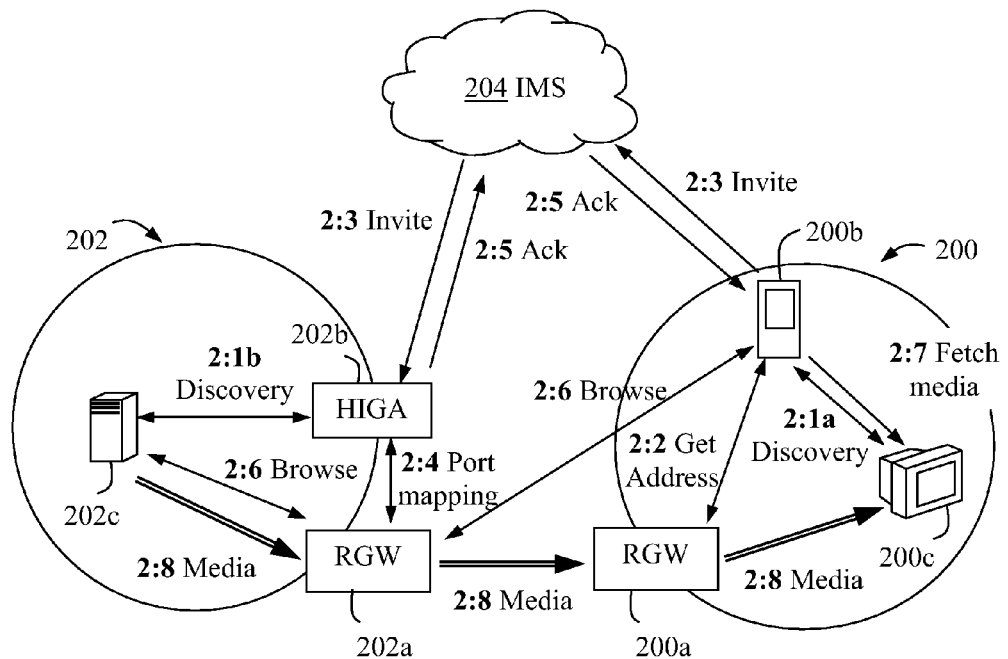
FIG. 2 is a schematic network overview illustrating a procedure for remote control of media communication across two different local networks, in accordance with one embodiment.

An exemplary procedure for remote control of media communication across two different local networks, will now be described with reference to the schematic network overview of FIG. 2, illustrating a first local network 200 and a second local network 202 with local devices, and an IMS network 204 for multimedia services. Each local network 200, 202 comprises a residential gateway RGW 200a and 202a, respectively, each providing a communication link for the local devices to other networks and nodes as described above. At least the second local network 202 further comprises a multimedia gateway HIGA 202b for communication with the IMS network 204.

A remote control device 200b is present in the first local network 200 which may contain various further local devices including a TV set 200c as shown here. The second local network 202 includes a media server 202c, although it may of course likewise contain various further devices, not shown. For example, a user of device 200b may be currently visiting network 200 in a friend's house or a hotel, while having knowledge of media stored in server 202c in network 202 which could be his/her home network.

It is assumed that device 200b is an IMS client having a valid IMS identity. Even though the IMS concept is used in this embodiment, it is possible to use any other similar standards and platforms for multimedia services networks and gateways, and the present invention is generally not limited in this respect. The procedure in FIG. 2 will now be described in terms of different steps or actions, each of which may represent one or more specific messages transferred back and forth depending on the protocols used.

According to initial steps 2:1a and 2:1b, a discovery process is conducted locally in each network 200, 202, where devices 200b and 200c exchange discovery information in the first local network 200, while HIGA 202b and media server 202c exchange discovery information in the second local network 202. In this way, the remote control device 200b obtains discovery information on device 200c including a local IP address and port number, as well as on any other devices present in the local network 200, and HIGA 202b obtains similar discovery information on at least the media server 202c. Naturally, steps 2:1a and 2:1b can be executed independent of each other, i.e. not necessarily at the same time.

In this example, the user of device 200b wish to view media content stored in media server 202c and may select device 200c as a media renderer to receive and play out the media content from media server 202c. In response to some suitable input command from the user, the remote control device 200b gains an external IP address and a range of port numbers used by the RGW 200a for external communication, in a next step 2:2. So far, steps 2:1a, 2:1b and 2:2 may be executed using the UPnP protocol or any other suitable protocol for local communication.

The remote control device 200b then sends a session invite message over a suitable session control node (not shown) in the IMS network 204 as a remote access request to HIGA 202b in the second local network, in a following step 2:3. In this example, the session invite message is effectively a request for a connection to a specific selected device in the second local network 202, i.e. media server 202c. The session invite message of step 2:3 may then be directed to an IMPU of the HIGA 202b specifically allocated for remote access and contains an identity of the selected device in network 202. The session invite message may automatically introduce a certain level of security, being sent over the IMS network 204 where authentication is required, as the remote control device 200b is thereby a valid IMS client which can be generally deemed trustworthy.

Before requesting a connection to a specific selected device, device 200b may send an initial session invite message devoid of any selected device identity, to HIGA 202b effectively as a request for discovery information on devices in the second local network 202. The response from HIGA 202b will then point to a UPnP proxy in HIGA 202b from which the remote control device 200b can obtain discovery information on devices in network 202 over the IMS network 204, after which the session is closed. The user of device 200b may then select a specific device in network 202 for communication and send another session invite message to HIGA 202b in a new session as a request for a connection to the selected device, i.e. as of step 2:3 above.

Further, the media server 202c in network 202 to which a connection is wanted should be indicated in the session invite message of step 2:3 by a local identity, e.g. a UPnP identity. As mentioned above, the user already knows in this example that media server 202c is to be utilised for the forthcoming media session, and by some suitable user input command, device 200b thus further includes the local (UPnP) identity of media server 202c in the session invite message of step 2:3.

Then, in a step 2:4, in response to receiving the session invite message above, HIGA 202b obtains a NAT binding, or "port mapping", in the RGW 202a mapping the local IP address and port number of the media server 202c with an external public IP address and a port number of the RGW 202a.

A suitable acknowledge message is then sent from HIGA 202b back to the remote control device 200b over the IMS network 204, in a further step 2:5, containing at least the external IP address and port number of the RGW 202a according to the NAT binding or port mapping established for media server 202c in step 2:4 above. The remote control device 200b may then browse for media content in the media server 202c via RGW 202a in a following step 2:6, using the received external IP address and port number of RGW 202a. For example, a VPN tunnel may be established between devices 200b and 202c via RGW 202a for peer-to-peer browsing in this step.

After the user has selected media content for communication from the media server 202c, the remote control device 200b orders the TV set 200c to fetch the media content from media server 202c in the opposite network 202, in a next step 2:7. This can be done by means of HTTP (Hypertext Transfer Protocol) messaging between devices 200b and 200c where device 200b sends a URL (Universal Resource Locator) to device 200c pointing at the selected media content in media server 202c. Further, the external IP address and port number of RGW 202a for media server 202c received in step 2:5 are also provided here, to be used by the TV set 200c in the forthcoming session with media server 202c.

Finally, the TV set 200c accordingly sets up a media session with media server 202c using the received URL in a conventional manner, not shown, and the selected media content is transferred as shown in step 2:8. For example, device 200c may send an HTTP GET message to device 202c including the received URL, to initiate a streaming session.

A more detailed example of how the inventive solution can be implemented for remotely controlling the transfer of media from a home network to a device in a visited remote network, will now be described with reference to the signalling diagram in FIG. 3. It will be readily understood by the skilled person that each shown signalling step in FIG. 3 may represent one or more specific messages transferred back and forth according to the used protocols.

Figure 3:
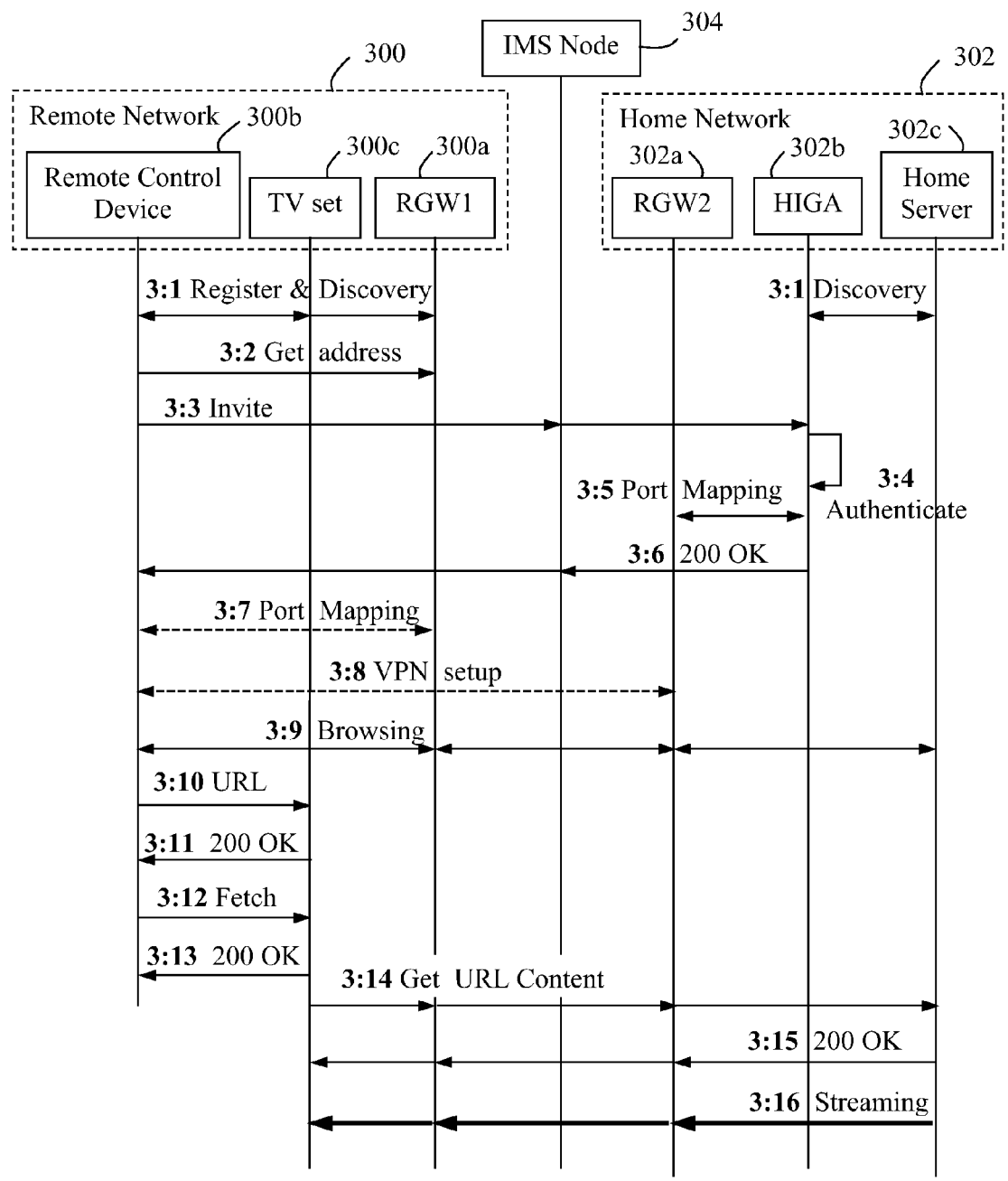
FIG. 3 is a signalling diagram illustrating in more detail how the inventive solution for remote control of media communication across two different local networks can be implemented, in accordance with another embodiment.

Thus, FIG. 3 illustrates a local remote network 300, a local home network 302, and an IMS session control node 304 in an IMS network. Each network 300, 302 comprises a residential gateway RGW1 300a and RGW2 302a, respectively. A remote control device 300b is currently visiting the remote network 300 but may actually belong to the home network 302, although this is not necessary. Further, the remote network 300 includes a TV set 300c, and the home network 302 includes a multimedia gateway HIGA 302b and a home server 302c in which media content is stored. It is assumed that the protocol UPnP is used for communication locally within the networks 300, 302, although other local communication protocols are also possible to use in the example described below.

In this example, it is further assumed that the user of device 300b has some knowledge of at least the home server 302c in network 302 and its media content. Device 300b may have conducted a discovery process in network 302 at some point previously, thereby having discovery information on the home server 302c already stored, including its UPnP identity. The following signalling steps or actions are thus executed when the remote control device 300b initiates media transfer across the networks 300 and 302, i.e. from the home server 302c to the TV set 300c. Dashed arrows indicate optional steps.

Step 3:1—The remote control device 300b registers in network 300 and obtains a local IP address, assigned to device 300b by RGW1 300a for communication within network 300. Device 300b further conducts a discovery process in this step and obtains local IP addresses, capabilities and service descriptions of any other devices present in the network 300, including the TV set 300c, in accordance with the UPnP protocol. A similar discovery process is also executed at some point in the home network 302 where HIGA 302b obtains local IP addresses, capabilities and service descriptions of devices present in network 302, including the home server 302c. This step basically corresponds to steps 2:1a and 2:1b in FIG. 2. The user of device 300b now decides to use the TV set 300c for fetching and playing out media content from the home server 302c, as similar to the example of FIG. 2.

Step 3:2—In response to a suitable user input command, the remote control device 300b obtains, through UPnP or other means, the external IP address of RGW1 300a and a valid range of possible port numbers that can be used for the forthcoming media session. This step basically corresponds to step 2:2 in FIG. 2.

Step 3:3—The remote control device 300b requests a connection to the home server 302c by issuing a SIP INVITE message, directed to an IMPU of HIGA 302b allocated for remote access, as a remote access request. The SIP INVITE message is routed over the IMS node 304. The SIP INVITE message includes the UPnP identity of the home server 302c, which is generally used to establish DLNA-based connections to specific local devices. The SIP INVITE message further includes the external IP address of RGW1 300a and a port number selected from the valid port number range obtained in step 3:2, to be used for the forthcoming media session at network 302. This step basically corresponds to step 2:3 in FIG. 2. It should be noted that a suitable input from the user, indicating the selected home server 302c, is preferably received at device 300b at some point before step 3:3, e.g. in the input command triggering step 3:2 or a separate input command triggering step 3:3.

Step 3:4—HIGA 302b authenticates the user of device 300b and the INVITE message, e.g. through the so-called "P-Asserted-Identity". Since the SIP INVITE message was sent over the IMS node 304, a certain level of security is automatically obtained as the remote control device 300b must be a valid IMS client in order to register with the IMS network, assuming that authorised IMS clients can be generally deemed trustworthy. For example, using the existing P-Asserted-Identity authentication method, it is thus not necessary to introduce any extra security mechanism for admitting the remote access.

Step 3:5—HIGA 302b then requests that a NAT binding is established in RGW2 302a according to the UPnP protocol, where the IP address and port number of home server 302c are mapped to an external IP address and port number of the RGW2 302a. This step basically corresponds to step 2:4 in FIG. 2. Optionally, the external IP address and selected port number of RGW1 300a in the remote network 300, as received in the SIP INVITE message of step 3:3, may also be saved in the NAT binding, in order to enhance the security by creating a rule dictating that the RGW2 302a will only allow incoming traffic from that specific and known source IP address and port number.

Step 3:6—HIGA 302b sends a SIP 200 OK message to the remote control device 300b in response to the SIP INVITE message of step 3:3, including an SDP message that contains the external IP address and port number of RGW2 302c. This step basically corresponds to step 2:5 in FIG. 2.

Step 3:7—Optionally at this point, a NAT binding may also be established where the local IP address and port number of the TV set 300c are mapped to the external IP address and port number of the RGW1 300a in RGW1 300a, according to the UPnP protocol. This NAT binding would be required in the case if the remote control device 300b would directly invite the home server 302c to deliver media to the TV set 300c, instead of ordering the TV set 300c to do so as in this example, see steps 3:10-3:13 below. These steps are however not shown in the diagram and should be viewed as an alternative implementation. Hence, instead of executing steps 3:10-3:13 when the remote control device 300b effectively initiates and triggers the TV set 300c to start the media session, the remote control device 300b may directly initiate the home server 302c to start to stream the media content to the TV set 300c, without involving the latter in the session set-up. This requires however that the remote control device 300b can somehow obtain the local IP address and port number of the TV set 300c, and that these are correctly mapped onto an externally routable IP address and port number in the RGW1 300a.

Another option would be to create a rule, as similar to step 3:5 above, for the external IP addresses and port numbers of RGW2 302a in the home network 302, so that only incoming traffic are allowed from the specific and known source IP addresses and Port numbers of RGW2 302a.

Step 3:8—Optionally, a VPN tunnel may be established at this point between the remote control device 300b and the RGW2 302a.

Step 3:9—The remote control device 300b may conduct peer-to-peer browsing with the home server 302c to search for media therein, using the UPnP protocol.

Step 3:10—In response to another suitable input command from the user, the remote control device 300b sends a URL or URI to the TV set 300c, pointing to selected media content in the home server 302c, in order for it to fetch the correct content/media from the Home Device. The URL or URI is sent in an HTTP message such as e.g. "HTTP POST setAVTransport URI( )".

Step 3:11—The TV set 300c responds with an HTTP 200 OK message.

Step 3:12—The remote control device 300b sends a trigger to the TV set 300c to initiate streaming of the content, in a message "HTTP POST (AVTransport::Play( ))"

Step 3:13—The TV set 300c again responds with an HTTP 200 OK message.

Step 3:14—The TV set 300c starts a session with the home server 302c by sending an HTTP message "HTTP GET URL" thereto.

Step 3:15—The home server 302c responds with an HTTP 200 OK message.

Step 3:16—A streaming session is executed according to HTTP, where the wanted media content is transferred from home server 302c to TV set 300c.

An example of how the SIP INVITE message from the remote control device 300b in step 3:3 can be configured is shown below. In this example, the user of the remote control device 300b is called Alice and higa_ra@operator.com is the address of HIGA 302b used for remote access requests.
INVITE sip:higa_ra@operator.com SIP/2.0
Via: SIP/2.0/UDP ws1.operator2.com:5060; branch=ufy7345hflwdsl
Max-Forwards: 70
P-Asserted-Identity: Alice<sip:alice@operator.com>
From: Alice<sip:alice@operator.com>; tag=8964dhdha8
To: HIGA_RA<sip:higa_ra@operator.com>
Call-ID: 26498265027552@192.0.100.2
CSec: 1 INVITE
Contact: <sip:alice@192.0.100.2
Content-Type: application/sdp
Content length: 151
v=0
o=alice 375864989 590506500 IN IP4 ws1.operator2.com
s=-
c=IN IP4 192.0.100.2 (i.e., the IP address of RGW1 300a)
t=0 0
m=message 20002 (i.e., the port number in RGW1 300a used for video streams)
a=deviceID:Media_server (i.e., the UPnP identity of home server 302c)

Figure 4:
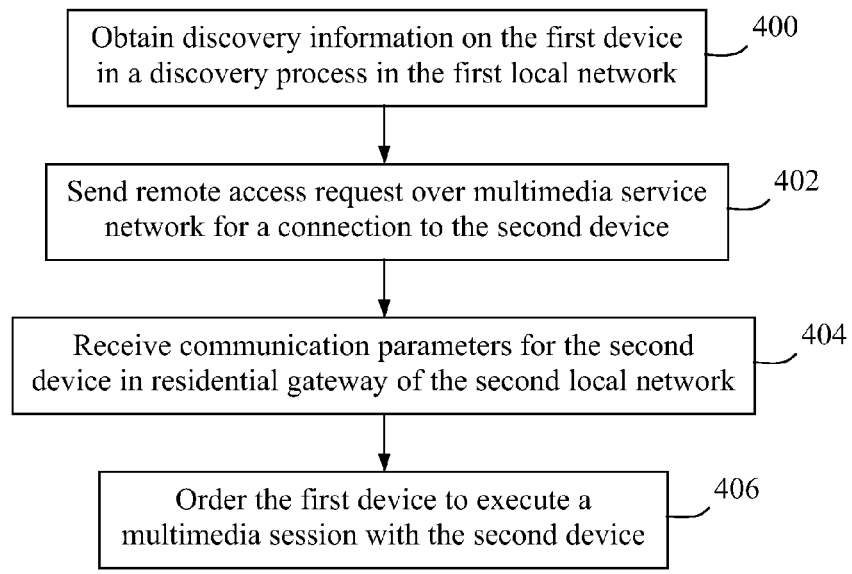
FIG. 4 is a flow chart illustrating a procedure for remote control of a device in one local network to communicate media content with a device in another local network, in accordance with yet another embodiment.

A procedure will now be described, with reference to a flow chart in FIG. 4, of remotely controlling the communication of media between a first device in a first local network and a second device in a second local network by means of a remote control device present in the first local network, according to another embodiment. Each of the first and second local networks comprises a residential gateway for external connections. The following steps are generally executed by the remote control device.

In a first step 400, discovery information is obtained on the first device when participating in a discovery process in the first local network. This step basically corresponds to steps 2:1a,b and 3:1 in the above examples, respectively.

In a next step 402, a remote access request is sent over a multimedia service network to a home multimedia gateway in the second local network, for a connection to the second device. This step basically corresponds to steps 2:3 and 3:3 in the above examples, respectively.

In a further step 404, communication parameters for the second device in the residential gateway of the second local network, are received from the home multimedia gateway over the multimedia service network in response to the remote access request of step 402.

In a final step 406, the first device is ordered to execute a multimedia session with the second device by using the received communication parameters for the second device. The procedure above can thus be utilised for ordering the first device either to fetch selected media content from the second device, or to send media content to the second device.

Figure 5:
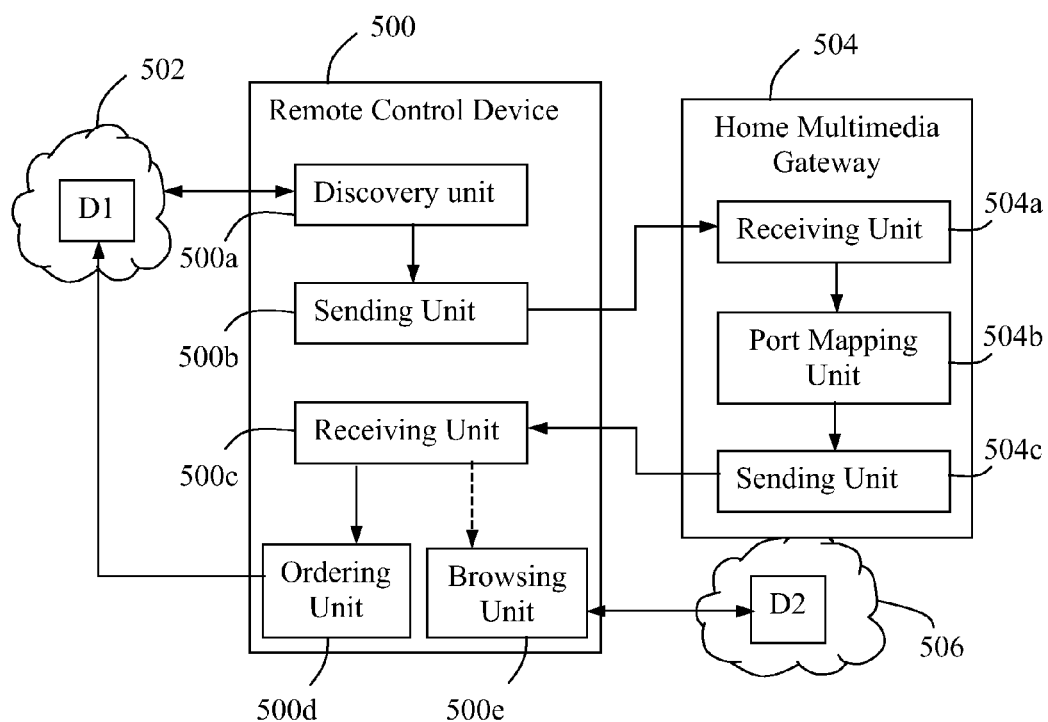
FIG. 5 is a schematic block diagram illustrating a remote control device and a home multimedia gateway adapted for remote control of media communication across two different local networks, in accordance with yet another embodiment.

FIG. 5 is a block diagram illustrating in more detail how the above-mentioned remote control device and home multimedia gateway can be configured as arrangements with functional units. The flow of information and messages is generally indicated by various arrows in the figure, which the skilled person is able to implement by means of suitable protocols and interfaces that are therefore not necessary to describe here in any detail. It should be noted that this figure merely illustrates the various functional units in a logical sense, while the skilled person is free to implement these functions in practice using any suitable software and hardware means. Thus, the present invention is generally not limited to the shown structures of the remote control device and the home multimedia gateway.

In the figure, the remote control device 500 is present in a first local network 502 comprising at least a first device D1, and the home multimedia gateway 504 is connected to a second local network 506 comprising at least a second device D2.

The remote control device 500 comprises a discovery unit 500a adapted to obtain discovery information on at least the first device D1 by conducting a discovery process in the first local network 502. The remote control device 500 further comprises a sending unit 500b adapted to send a remote access request over a multimedia service network, not shown, directed to the home multimedia gateway 504, for a connection to the second device D2.

The remote control device 500 further comprises a receiving unit 500c adapted to receive communication parameters for the second device D2 in the residential gateway, not shown, of the second local network 506, from the home multimedia gateway 504 over the multimedia service network in response to the remote access request. The remote control device 500 further comprises an ordering unit 500d adapted to order the first device D1 to execute a multimedia session with the second device by using the received communication parameters for the second device in the residential gateway of the second local network. The remote control device 500 may also comprise a browsing unit 500e adapted to use the received communication parameters for media browsing in the second device D2.

The home multimedia gateway 504 comprises a receiving unit 504a adapted to receive the remote access request from the remote control device 500 over the multimedia service network, for a connection to the second device D2. The home multimedia gateway 504 further comprises a port mapping unit 504b adapted to obtain the communication parameters for the second device D2 in the residential gateway of the second local network 506, in response to the received remote access request. The port mapping unit may be further adapted to obtain a NAT binding and port mapping as the communication parameters, mapping the local IP address and port number of the second device with an external public IP address and a port number of the residential gateway of the second local network.

The home multimedia gateway 504 further comprises a sending unit 504c adapted to send the communication parameters to the remote control device 500, thereby enabling the remote control device to order the first device D1 to execute a multimedia session with the second device D2 by using the provided communication parameters.

By using the present invention, e.g. according to the above-described embodiments, a remote control device visiting a local network is able to order a device in that network to fetch media content from a device in another home network, or vice versa. Thereby, the above-mentioned 3-box model can be effected remotely and a device can be selected as a media renderer in one local network to play out selected media from a server or the like in another local network. The transfer of selected media from one device for storage in a server or the like in another local network, can also be remotely controlled. The remote control device can also be deemed trustworthy since the session invite message is sent over the multimedia service network where authentication is required, which provides for added automatic security.

While the invention has been described with reference to specific exemplary embodiments, the description is in general only intended to illustrate the inventive concept and should not be taken as limiting the scope of the invention. Although the concepts of IMS, HIGA, UPnP and DLNA have been used when describing the above embodiments, any other similar suitable standards, protocols and network elements may basically be used for enabling the remote control of media transfer across local networks as described herein. Further, the described discovery processes can be executed according to other protocols than UPnP, such as Bluetooth, ZigBee, IrDA (Infrared Data Association) and Bonjour. The present invention is generally defined by the following independent claims.

The invention claimed is:

1. A method of remotely controlling communication of media between a first device in a first local network and a second device in a second local network, which is remote from the first local network, by a remote control device also present in the first local network, the first local network comprising a first residential gateway for external connections and the second local network comprising a second residential gateway for external connections, the method comprising:

obtaining, by the remote control device, discovery information on the first device by the remote control device conducting a discovery process in the first local network;

the remote control device sending a remote access request over a multimedia service network to a home multimedia gateway in the second local network for a connection to the second device;

the remote control device receiving communication parameters transmitted by the home multimedia gateway over the multimedia service network in response to said remote access request, said communication parameters comprising an external network address allocated to the second residential gateway; and the remote control device present in the first local network ordering the first device, which is also present in the first local network, to fetch an identified media content item from the second device present in the second local network, which is remote from the first local network, wherein ordering the first device present in the first local network to fetch the identified media content item from the second device present in the second local network comprises:

the remote control device providing to the first device said received communication parameters allocated to the second residential gateway; and the remote control device providing to the first device a media content identifier identifying the media content item, wherein the remote control device present in the first local network is separate and distinct from the first residential gateway;

wherein the step of providing the media content identifier to the first device consists of providing to the first device a Uniform Resource Locator (URL) or Uniform Resource Identifier (URI) comprising information pointing to the media content item; wherein the URL or URI further comprises the external network address allocated to the second residential gateway; and wherein the remote access request includes an external IP address used by the first residential gateway of the first local network for external communication.

2. The method according to claim 1, wherein the remote control device uses the received communication parameters for media browsing in the second device.

3. The method according to claim 1, wherein the remote control device orders the first device to send media content to the second device.

4. The method according to claim 1, wherein the remote access request is an Internet Protocol Multimedia System (IMS) session invite message directed to an IMS identity of the home multimedia gateway.

5. The method according to claim 4, wherein the Session Initiation Protocol (SIP) is used for communication with the home multimedia gateway over the multimedia service network, and the IMS session invite message is a SIP INVITE message.

6. The method according to claim 1, wherein
the received communication parameters further comprise a port number allocated to the second device by the second residential gateway, and
the method further comprises the first device, in response to receiving the order from the remote control device, transmitting a message having a destination network address and a destination port number, wherein the destination network address is the external network address allocated to the second residential gateway and the destination port number is the port number allocated to the second device by the second residential gateway, thereby enabling the second residential gateway to determine that the second device is the intended recipient of the message.

7. The method according to claim 1, wherein the remote access request includes a local identity of the second device.

8. The method according to claim 1, further comprising the remote control device receiving from the second device information identifying a plurality of media content items that are stored in the second device and that are available to be remotely accessed by the first device.

9. The method according to claim 8, wherein
the method further comprises the remote control device enabling a user of the remote control device to select one of the plurality of media content items,
the step of ordering the first device to fetch the identified media content item from the second device is performed after the user selects one of the media content items, and
the media content identifier identifies the media content item selected by the user.

10. The method according to claim 9, wherein providing to the first device said media content item identifier identifying the selected media content item comprises sending to the first device a URI or URL containing the media content item identifier.

11. The method according to claim 1, further comprising prior to ordering the first device to fetch the identified media content item from the second device, initiating the setup of a virtual private network (VPN) tunnel between the remote control device and the second residential gateway.

12. The method according to claim 1, wherein said remote access request comprises a Universal Plug and Play (UPnP) identifier for identifying the second device.

13. The method according to claim 1, wherein the step of ordering the first device to fetch the identified media content item from the second device further comprises the remote control device transmitting to the first device a trigger for causing the first device to initiate a session with the second device.

14. The method according to claim 1, further comprising:
prior to the remote control device sending the remote access request to the home multimedia gateway in the second local network, the remote control device transmitting to the first residential gateway in the first local network a get address request message; and
the remote control device receiving from the first residential gateway a response to the get address request message, said response comprising a external IP address of the first residential gateway, wherein the remote access request sent to the home multimedia gateway by the remote control device includes said external IP address of the first residential gateway.

15. The method according to claim 14, wherein
said response to the get address request message further comprises a plurality of port numbers,
the method further comprises the remote control device selecting on of the plurality of port numbers, and
the remote access request sent to the home multimedia gateway by the remote control device further includes the port number selected by the remote control device.

16. A remote control device for remotely controlling communication of media between a first device in a first local network and a second device in a second local network when the remote control device is present in the first local network, the first local network comprising a first residential gateway for external connections and the second local network comprising a second residential gateway for external connections, the remote control device comprising:
a transmitter;
a receiver; and
a processing apparatus comprising one or more processors, wherein the processing apparatus is configured to:
conduct a discovery process in the first local network to obtain discovery information on the first device;
employ the transmitter to send a remote access request over a multimedia service network directed to a home multimedia gateway in the second local network for a connection to the second device;
employ the receiver to obtain, from the home multimedia gateway over the multimedia service network in response to said remote access request, communication parameters established for the second device in the second residential gateway of the second local network, said communication parameters comprising an external network address allocated to the second residential gateway; and
as a result of a user input indicating that a user of the remote control desires to obtain a selected media content item, instruct the first device to fetch the selected media content item by providing to the first device a) the obtained communication parameters established for the second device in the second residential gateway and b) a media content identifier identifying the selected media content item;
wherein the processing apparatus is configured to provide the media content identifier identifying the selected media content item to the second device by employing the transmitter to transmit to the second device a Uniform Resource Locator (URL) or Uniform Resource Identifier (URI) comprising the media content identifier, the URL or URI further comprises the external network address allocated to the second residential gateway; and wherein the processing apparatus is further configured to include an external IP address in the remote access request, used by the residential gateway of the first local network for external communication.

17. The remote control device according to claim 16, further comprising a browsing unit configured to use the received communication parameters for media browsing in the second device.

18. The remote control device according to claim 16, wherein the processing apparatus is further configured to order the first device to send media content to the second device.

19. The remote control device according to claim 16, wherein the remote access request is an IMS session invite message directed to an IMS identity of the home multimedia gateway.

20. The remote control device according to claim 19, wherein the processing apparatus is further configured to use SIP for communication with the home multimedia gateway over the multimedia service network, and the IMS session invite message is a SIP INVITE message.

21. The remote control device according to claim 16, wherein the obtained communication parameters further comprise a port number allocated to the second device by the second residential gateway.

22. The remote control device according to claim 16, wherein the remote access request includes a local identity of the second device.

23. A home multimedia gateway for enabling remote control of media communication between a first device in a first local network and a second device in a second local network by a remote control device present in the first local network, the first local network comprising a first residential gateway, the second local network comprising a second residential gateway, and the home multimedia gateway being connected to the second local network and being separate and distinct from the second residential gateway, the home multimedia gateway comprising:
   a transmitter;
   a receiver for receiving a remote access request transmitted by the remote control device to the home multimedia gateway, the remote access request comprising an identifier identifying the second device; and
   a processing apparatus comprising one or more processors, wherein
   the processing apparatus is configured such that, as a result of the home multimedia gateway receiving said remote access request transmitted by the remote control device, the home multimedia gateway: i) transmits to the second residential gateway a request for communication parameters allocated to the second device, ii) employs the receiver to receive from the second residential gateway a response to the request, said response comprising an external network address and a port number allocated to the second device, and iii) employs the transmitter to transmit to the remote control device the external network address and the port number obtained from the second residential gateway, wherein
   the second residential gateway is separate and distinct from the home multimedia gateway.

\* \* \* \* \*